(12) United States Patent
Acharya et al.

(10) Patent No.: US 6,917,623 B1
(45) Date of Patent: Jul. 12, 2005

(54) SYSTEM AND METHOD FOR TRANSFERRING DATA IN A NETWORK DEVICE

(75) Inventors: Yatin R. Acharya, Sunnyvale, CA (US); Bahadir Erimli, Campbell, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 877 days.

(21) Appl. No.: 09/816,334

(22) Filed: Mar. 26, 2001

(51) Int. Cl.[7] .............................................. H04L 12/54
(52) U.S. Cl. ..................................................... 370/429
(58) Field of Search ............................... 370/229, 412, 370/413, 428, 429, 446, 419, 445; 709/240

(56) References Cited

U.S. PATENT DOCUMENTS

| | | | |
|---|---|---|---|
| 6,049,530 A | * 4/2000 | Petersen et al. | 370/248 |
| 6,424,658 B1 | * 7/2002 | Mathur | 370/429 |
| 6,477,170 B1 | * 11/2002 | Lu et al. | 370/402 |
| 6,487,212 B1 | * 11/2002 | Erimli et al. | 370/413 |
| 6,618,357 B1 | * 9/2003 | Geyer et al. | 370/236 |
| 6,654,835 B1 | * 11/2003 | Foster et al. | 710/110 |
| 6,658,015 B1 | * 12/2003 | Merchant et al. | 370/422 |
| 6,700,894 B1 | * 3/2004 | Shung | 370/412 |
| 6,804,234 B1 | * 10/2004 | Chow | 370/389 |

* cited by examiner

*Primary Examiner*—Chau Nguyen
*Assistant Examiner*—Blanche Wong
(74) *Attorney, Agent, or Firm*—Harrity & Snyder LLP

(57) ABSTRACT

A network device includes a port filter, a first logic device, and a second logic device. The port filter receives a data frame and generates first data relating to the data frame. The first logic device generates second data for the received data frame. The second logic device receives the first data and determines whether the second data has been received. When the second data has not been received, the second logic prevents a transfer of different first data relating to a different data frame from the port filter.

20 Claims, 7 Drawing Sheets

US 6,917,623 B1

SYSTEM AND METHOD FOR TRANSFERRING DATA IN A NETWORK DEVICE

TECHNICAL FIELD

The present invention relates generally to communication systems and, more particularly, to a system and method for transferring data in a network device.

BACKGROUND ART

In computer networks, a number of network stations are typically interconnected via a communications medium. For example, Ethernet 802.3 is a commonly used local area network (LAN) scheme in which multiple stations are connected to a shared or dedicated serial data path. These stations often communicate with a switch or some other network device located between the data path and the stations connected to that path. The switch typically controls the communication of packets and includes logic for receiving and forwarding packets to their appropriate destinations.

Currently, when a switch receives a data frame, the switch may generate tag and forwarding data that aid the switch in processing the received data frame. This data may, for example, indicate the priority associated with the data frame and the port or ports through which the data frame is to be transmitted. Since different logic devices within the switch may generate and forward the tag data and the forwarding data, it is important that this data be matched up within the switch to ensure that the data frame is properly processed. Problems may arise when the tag data is generated and forwarded at a faster pace than the forwarding data. In such an event, the forwarding data for a particular data frame may be matched up with tag data for a subsequent frame.

DISCLOSURE OF THE INVENTION

There exists a need for a mechanism that improves flow control in a network. This and other needs are met by the present invention, where local hardware, under software control when needed, facilitates data frame processing by merging different sets of data generated in a network device for a received data frame.

Additional advantages and other features of the invention will be set forth in part in the description that follows and in part will become apparent to those having ordinary skill in the art upon examination of the following or may be learned from the practice of the invention. The advantages and features of the invention may be realized and obtained as particularly pointed out in the appended claims.

According to the present invention, the foregoing and other advantages are achieved in part by a network device that includes a port filter, a first logic device, and a second logic device. The port filter receives a data frame and generates first data relating to the data frame. The first logic device generates second data for the received data frame. The second logic device receives the first data and determines whether the second data has been received. When the second data has not been received, the second logic prevents a transfer of different first data relating to a different data frame from the port filter.

In another implementation consistent with the present invention, a system for transferring data includes a group of receiver modules, first logic, a group of registers that correspond to the receiver modules, and second logic. The receiver modules receive packets and generate first data relating to the packets. The first logic generates second data for the packets. The registers store the first and second data for the packets received by the corresponding receiver modules. The second logic determines, for each of the registers, whether first and second data for a received packet has been stored and prevents a transfer of different first or second data for a later received packet prior to the first and second data being stored.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, where elements having the same reference number designation represent like elements throughout.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
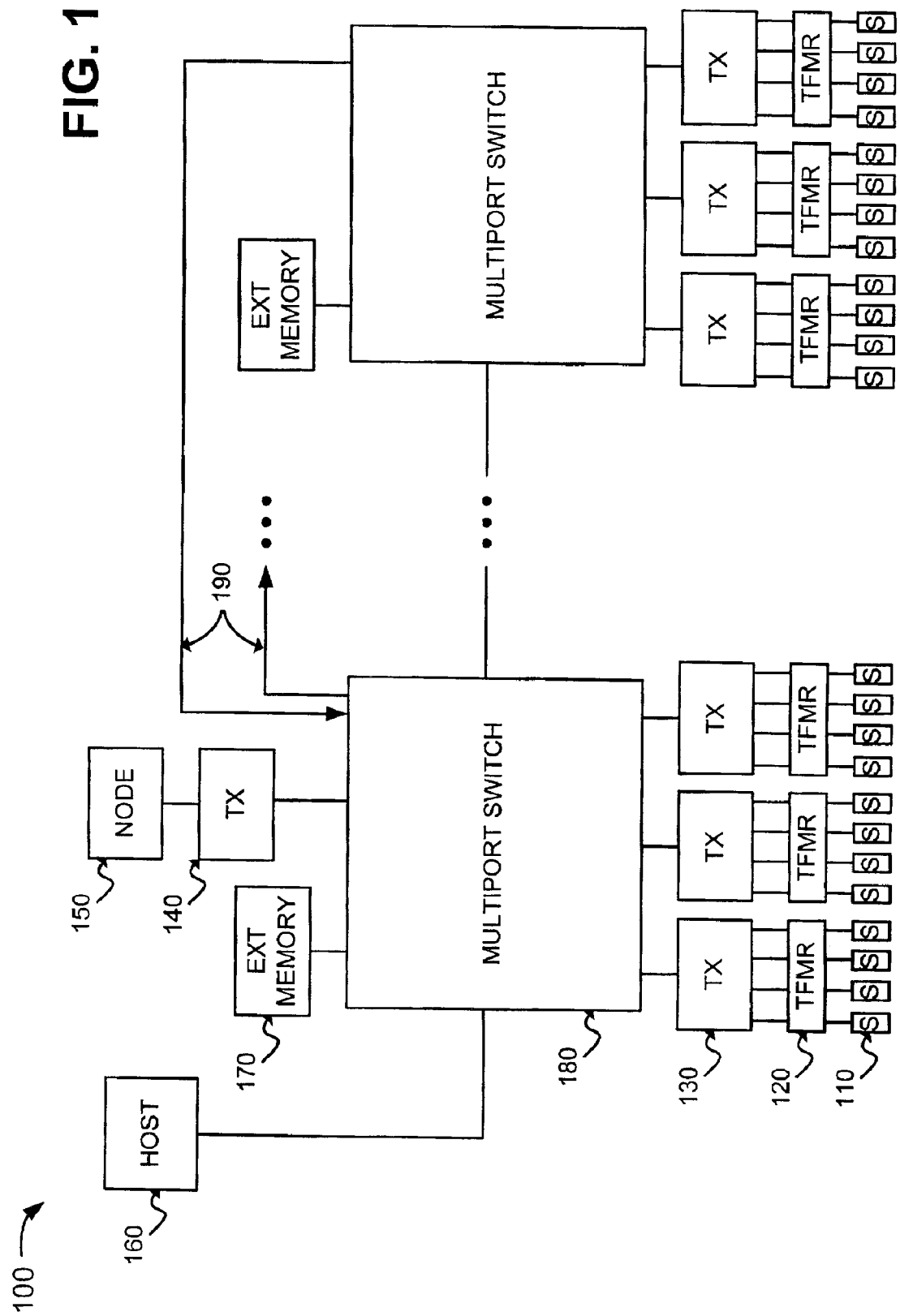
FIG. 1 is a block diagram of an exemplary system in which a system and method consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches i 80. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128 K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
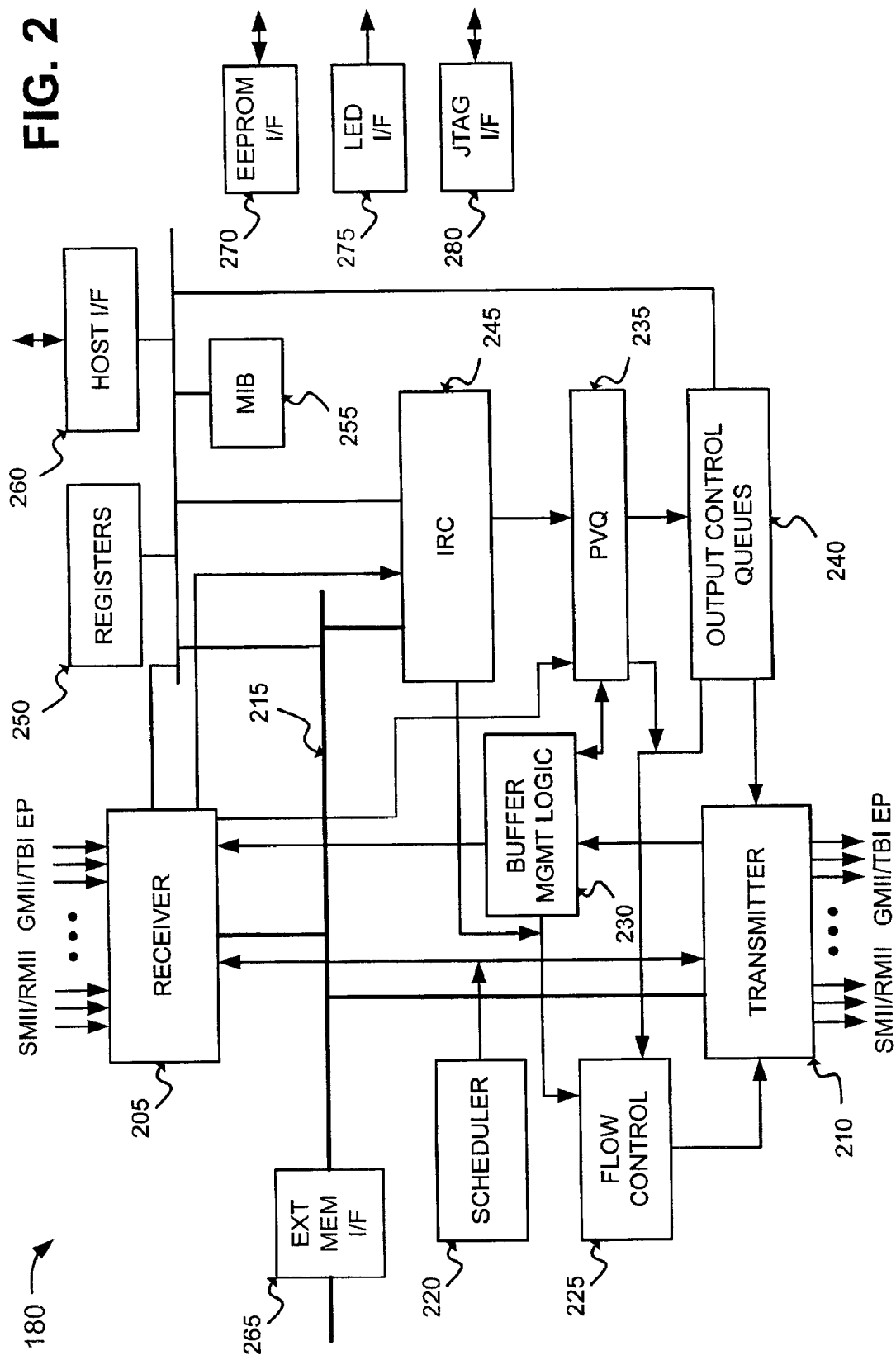
FIG. 2 is a detailed diagram of the multiport switch of FIG. 1 according to an implementation consistent with the present invention.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port Therefore, the IRC 245 determines whether a frame temporarily stored in the external memory 170 should be output to a single output port, multiple output ports, no output port, or another multiport switch 180. The IRC 245 may make its forwarding decision based on information stored in an IRC address table.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250. The registers 250, MIB counters 255, host interface 260, receiver 205, data bus 215, output control queues 240, and IRC 245 may be connected via a host bus 262.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

EXEMPLARY IMPLEMENTATION

The present invention is directed to logic that controls the transfer of data between a receiving port of the multiport switch 180 and the PVQ 235. This logic may be contained within the PVQ 235 or within another device in multiport switch 180.

Figure 3:
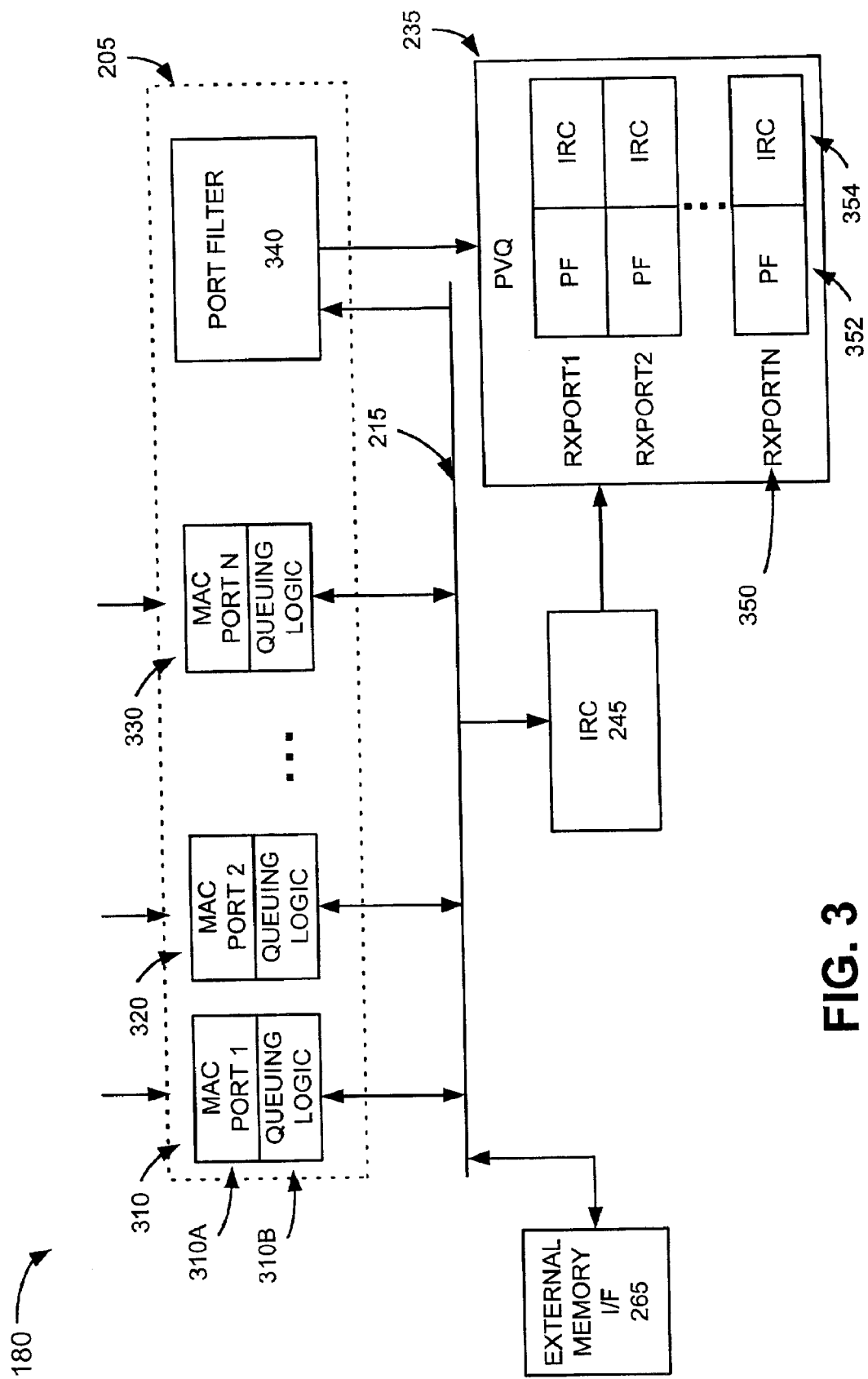
FIG. 3 is a detailed diagram of a portion of the multiport switch according to an implementation consistent with the present invention.

FIG. 3 is a detailed diagram of a portion of the multiport switch 180 according to an implementation consistent with the present invention. The portion of the multiport switch 180 shown in FIG. 3 includes the receiver 205, the data bus 215, the PVQ 235, the IRC 245, and the external memory interface 265. The receiver 205 may include MAC modules 310, 320, and 330 corresponding to input ports 1 through N, respectively, and a port filter 340. In an alternative implementation consistent with the present invention, the port filter 340 may be located externally to the receiver 205.

Each MAC module may include a receive FIFO buffer and queuing logic. For example, referring to FIG. 3, MAC module 310 includes a receive FIFO buffer 310A and queuing logic 310B. The other MAC modules may similarly include receive FIFO buffers and queuing logic.

The receive FIFO buffer 310A may include a FIFO buffer that temporarily buffers data frames received on the corresponding input port. The queuing logic 310B may include logic responsible for transferring data frames from the receive FIFO buffer 310A to the external memory 170 (FIG. 1) via the external memory interface 265.

The port filter 340 may include logic for determining a priority associated with a received data frame. The port filter 340 may generate its results in the format <Tag-Hit, PF Frame Pointer, PF Tag>("tag data") and send the results to the PVQ 235. The Tag-Hit indicates whether the PF Frame Pointer and PF Tag contain valid data, the PF Frame Pointer identifies the location of the data fame in memory, such as external memory 170, and the PF Tag identifies the priority of the data frame.

In an exemplary implementation of the present invention, the port filter 340 categorizes data frames as having either a high priority or a low priority. A high priority data frame may include a data frame that requires lower access latency, such as a data frame destined for a management device or a data frame for a multimedia application. A low priority data frame may include any other data frame. In alternative implementations, the number of priorities associated with the data frame may be greater than two. For example, the multiport switch 180 may identify data frames having one of three levels of priority, such as low, medium and high.

As described previously, the IRC 245 determines which output port will transmit a received data frame. The IRC 245 may determine that a given data frame should be transmitted on a single port, multiple ports, all ports, or no ports. The IRC 245 may generate its results in the format <IRC-Hit, IRC Frame Pointer, IRC Port Vector>("IRC data") and send the results to the PVQ 235. The IRC-Hit identifies whether the IRC Frame Pointer and IRC Port Vector contain valid data, the IRC Frame Pointer identifies the location of the data frame in memory, such as external memory 170, and the IRC Port Vector identifies the output port(s) from which the data frame is to be transmitted and the priority of the data frame.

The PVQ 235 may include multiple registers 350 corresponding to the MAC modules 310–330 (i.e., the receive ports) and logic for controlling the reading and writing of the registers 350. For example, the PVQ 235 may include one register 350 for each MAC module 310–330. The register 350 may include a port filter buffer 352 and an IRC buffer 354. The port filter buffer 352 may store tag data received from the port filter 340. The IRC buffer 354 may store IRC data received from the IRC 245. The PVQ 235 merges the tag data and IRC data for a particular data frame into the register corresponding to the MAC module that received the data frame.

Figure 4:
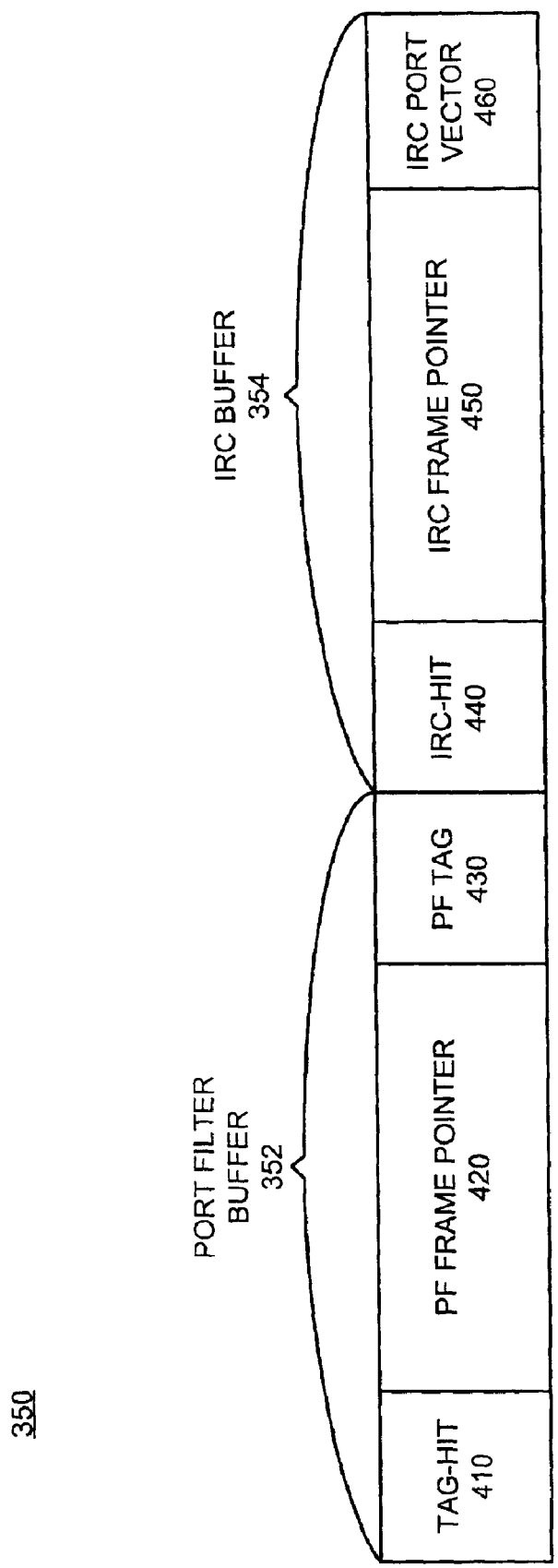
FIG. 4 is an exemplary diagram of the register of FIG. 3 according to an implementation consistent with the present invention.

FIG. 4 is an exemplary diagram of data fields stored in the register 350 according to an implementation consistent with the present invention. As described previously, the register 350 may include a port filter buffer 352 and an IRC buffer 354. The port filter buffer 352 may include a tag-hit field 410, a PF frame pointer field 420, and a PF tag field 430. The tag-hit field 410 may store data that indicates whether the PF frame pointer field 420 and the PF tag field 430 contain valid data. The PF frame pointer field 420 may store data that identifies the location of the data frame in external memory 170. The PF tag field 430 may store priority information for a data frame.

The IRC buffer 354 may include an IRC-hit field 440, an IRC frame pointer field 450, and an IRC port vector field 460. The IRC-hit field 440 may store data that indicates whether the IRC frame pointer field 450 and the IRC port vector field 460 contain valid data. The IRC frame pointer field 450 may store data that identifies the location of the data frame in external memory 170. The IRC port vector field 460 may store information that identifies an output port for a data frame and the priority of the data frame.

It will be appreciated that instances may exist when the writing from the port filter 340 and IRC 245 to the appropriate register in the PVQ 235 may not be synchronized. For example, problems may exist when the port filter 340 attempts to write tag data to a register of the PVQ 235 for a subsequently received data frame prior to the IRC 245 writing IRC data for a previous data frame. In such a situation, the PVQ 235 may not be able to properly merge (or match up) the tag data and IRC data for the previous data frame.

Figure 5:
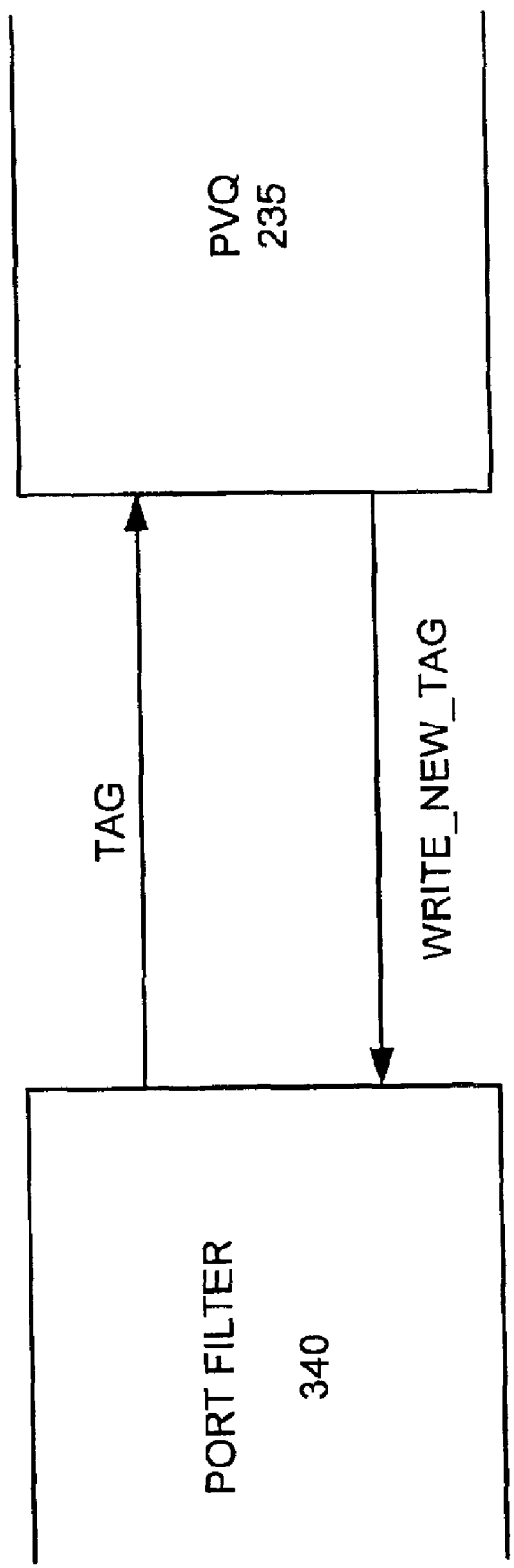
FIG. 5 is a diagram of exemplary signaling between the PVQ and a port filter in an implementation consistent with the present invention.

FIG. 5 is a diagram of exemplary signaling between the PVQ 235 and the port filter 340 in an implementation consistent with the present invention. To avoid the above described problem, the PVQ 235 monitors the registers and delays writing of new data from either the port filter 340 or IRC 245 prior to the tag data and IRC data for a particular data frame being merged. For example, to indicate that new tag data may be written to a register 350 in the PVQ 235, the PVQ 235 may transmit a WRITE_NEW_TAG signal to, for example, the port filter 340. In response to receiving the WRITE_NEW_TAG signal, the port filter 340 may write tag data for a subsequent data frame to the register 350. The PVQ 235 may then delay the transmission of another WRITE_NEW_TAG signal until the IRC data is received from the IRC 245 for this subsequent data frame. The PVQ 235 may delay the transmission of the WRITE_NEW_TAG signal until the writing of the corresponding IRC data is detected or for a predetermined period of time.

Figure 6:
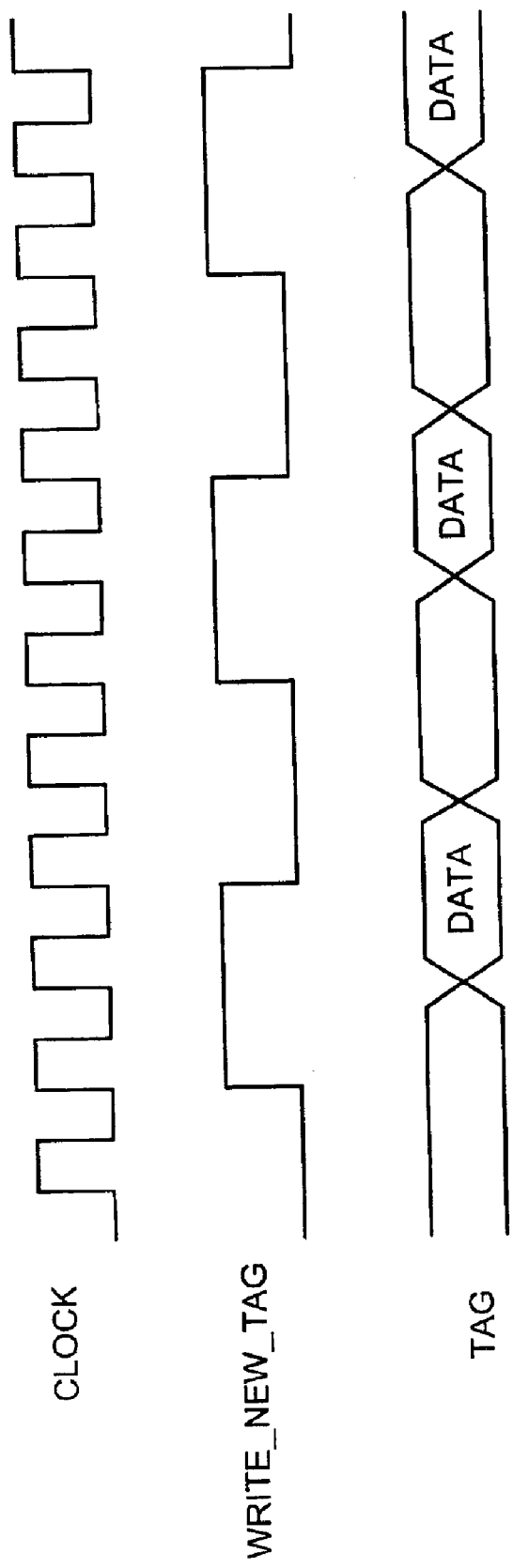
FIG. 6 is an exemplary timing diagram consistent with the present invention.

FIG. 6 is exemplary timing diagram consistent with the present invention. Depending upon the level of the WRITE_NEW_TAG signal, the port filter 340 generates new tag data and stores this data until the WRITE_NEW_TAG signal is received. After receiving the WRITE_NEW_TAG signal, the port filter 340 may write the new tag data to the appropriate register 350 of the PVQ 235.

EXEMPLARY PROCESSING

Figure 7:
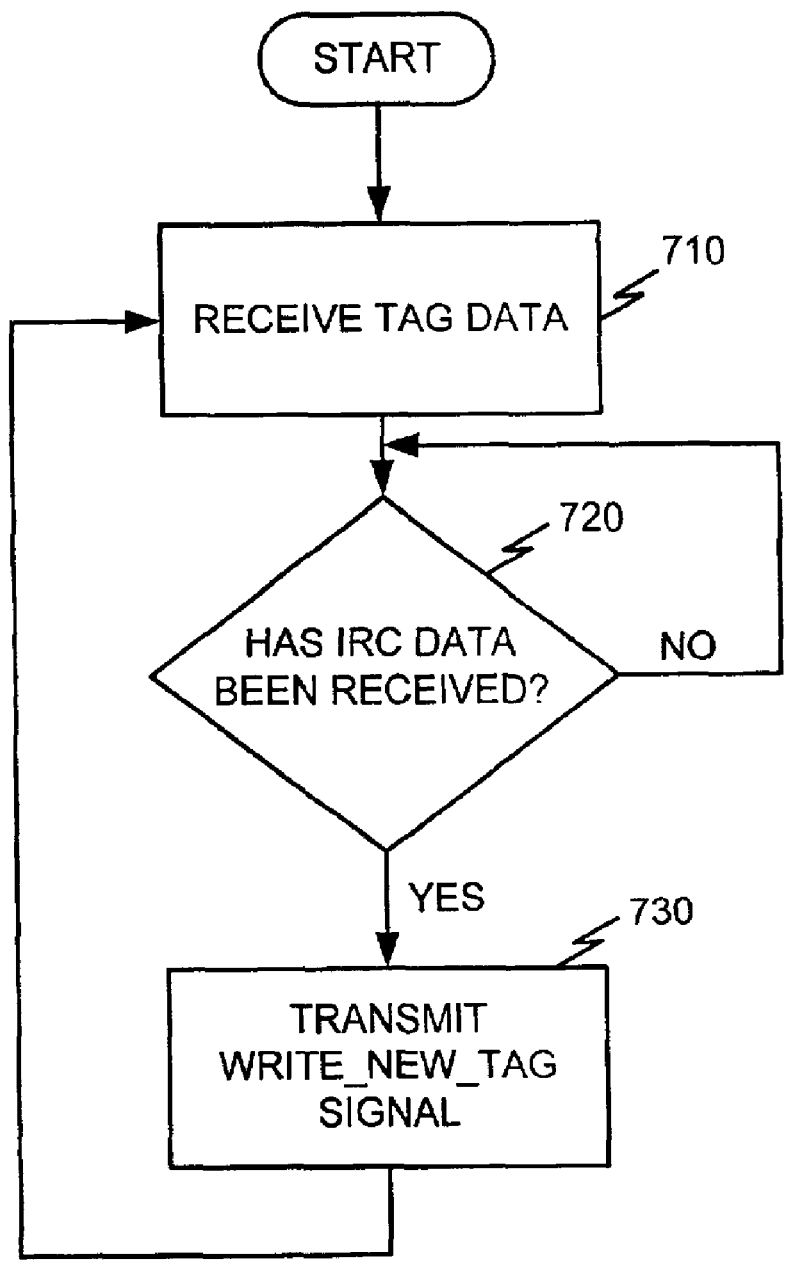
FIG. 7 is a flowchart of exemplary processing for transferring data in a network device according to an implementation consistent with the present invention.

FIG. 7 is a flowchart of exemplary processing for transferring data in a network device according to an implementation consistent with the present invention. Processing may begin with a PVQ, such as PVQ 235, receiving tag data from a port filter, such as port filter 340 [act 710]. As described above, the port filter 340 generates the tag data from a data frame received at the multiport switch 180. The tag data may include a Tag-Hit, a PF Frame Pointer, and a PF Tag. Once tag data has been received, the PVQ 235 may determine whether IRC data for the data frame has been received [act 720]. This IRC data may be transmitted by the IRC 245 and may include an IRC-Hit, an IRC Frame Pointer, and an IRC Port Vector.

Once corresponding IRC data has been received, the PVQ 235 may transmit a WRITE_NEW_TAG. Signal to the port filter 340 [act 730]. Upon receipt of this signal, the port filter 340 may transmit new tag data to the PVQ 235. Processing may then return to act 710.

Described has been a system and method for transferring data in a network device. An advantage of the present invention includes the ability to properly merge tag data and IRC data for a particular data frame regardless of delays in generating or writing the IRC data.

Only the preferred embodiments of the invention and a few examples of its versatility are shown and described in the present disclosure. It is to be understood that the invention is capable of use in various other combinations and environments and is capable of modifications within the scope of the inventive concept as expressed herein. For example, while several port filters were illustrated in FIG. 3, it will be appreciated that implementations consistent with the present invention are equally applicable to network devices having one port filter. Moreover, while a series of acts has been described with respect to FIG. 7, the order of the acts may be varied in other implementations consistent with the present invention. No element or act used in the description of the present application should be construed as critical unless explicitly described as such.

The scope of the invention is defined by the claims and their equivalents.

What is claimed is:

1. A method for transferring data in a network device, comprising:
   receiving a data frame;
   generating first data relating to the data frame;
   transferring the first data to a register;
   generating second data relating to the data frame; and
   preventing a transfer of new first data relating to another data frame to the register prior to transferring the second data to the register.

2. The method of claim 1 wherein the first data includes priority data.

3. The method of claim 1 wherein the second data includes forwarding information.

4. The method of claim 1 wherein the preventing includes:
   detecting the transfer of the second data to the register.

5. The method of claim 1 further comprising:
   permitting the new first data to be transferred after the second data has been transferred to the register.

6. The method of claim 5 wherein the permitting includes:
   transmitting a signal indicating that the new first data is to be transferred.

7. The method of claim 6 further comprising:
   delaying the transmitting of the signal for a predetermined period of time.

8. A network device comprising:
   a port filter to receive a data frame and generate first data relating to the data frame;
   a first logic device to generate second data for the received data frame; and
   a second logic device to receive the first data, determine whether the second data has been received, and prevent a transfer of different first data relating to a different data frame from the port filter when the second data has not been received.

9. The network device of claim 8 wherein the second logic device is further configured to:
   permit the transfer of the different first data when the second data has been received.

10. The network device of claim 9 wherein, when permitting the transfer of the different first data, the second logic device is configured to:
    transmit a signal to the port filter when the second data has been received.

11. The network device of claim 10 wherein the second logic device is further configured to:
    delay the transmission of the signal for a predetermined period of time.

12. The network device of claim 8 wherein the first logic device includes a decision-making engine and the second logic device includes a port vector queue.

13. The network device of claim 8 wherein the second logic device comprises:
    a register associated with the port filter, the register being configured to store the first and second data.

14. The network device of claim 13 wherein the second logic device is further configured to:
    merge the first and second data in the register.

15. A system for transmitting data in a network device, comprising:
    a plurality of receiver modules configured to receive packets and generate first data relating to the packets;
    first logic configured to generate second data for the packets;
    a plurality of registers corresponding to the receiver modules and configured to store the first and second data for the packets received by the corresponding receiver modules; and
    second logic configured to determine, for each of the registers, whether first and second data for a received packet has been stored and prevent a transfer of different first or second data for a subsequently-received packet prior to the first and second data being stored.

16. The system of claim 15 wherein, when preventing the transfer of different first or second data, the second logic is configured to:
    permit transfer of the different first or second data after the first and second data has been stored.

17. The system of claim 16 wherein, when permitting the transfer of the different first or second data, the second logic is configured to:
    transmit a signal to one of the plurality of receiver modules or the first logic.

18. The system of claim 17 wherein, when transmitting the signal, the second logic is configured to:
    delay the transmission for a predetermined period of time.

19. The system of claim 15 wherein the first logic includes a forwarding engine and the second data comprises data forwarding information identifying at least one output port.

20. The system of claim 15 wherein each of the plurality of receiver modules includes a port filter and the first data comprises priority information identifying a priority associated with the packet.

* * * * *